(12) United States Patent
Spies et al.

(10) Patent No.: US 7,769,820 B1
(45) Date of Patent: Aug. 3, 2010

(54) UNIVERSAL RESOURCE LOCATOR VERIFICATION SERVICES USING WEB SITE ATTRIBUTES

(75) Inventors: Terence Spies, San Mateo, CA (US); Matthew J. Pauker, San Francisco, CA (US); Rishi R. Kacker, Woodside, CA (US); Guido Appenzeller, Menlo Park, CA (US); Sathvik Krishnamurthy, San Jose, CA (US); David S. Thompson, San Francisco, CA (US)

(73) Assignee: Voltage Security, Inc., Palo Alto, CA (US)

( * ) Notice: Subject to any disclaimer, the term of this patent is extended or adjusted under 35 U.S.C. 154(b) by 1091 days.

(21) Appl. No.: 11/173,415

(22) Filed: Jun. 30, 2005

(51) Int. Cl.
*G06F 15/16* (2006.01)
(52) U.S. Cl. .................... 709/218; 709/219
(58) Field of Classification Search .................. 709/218
See application file for complete search history.

(56) References Cited

U.S. PATENT DOCUMENTS

| 6,442,606 | B1 | 8/2002 | Subbaroyan | |
|---|---|---|---|---|
| 7,203,838 | B1 * | 4/2007 | Glazer et al. | 713/176 |
| 7,296,016 | B1 | 11/2007 | Farach-Colton | |
| 2004/0078422 | A1 | 4/2004 | Toomey | |
| 2004/0123157 | A1 | 6/2004 | Alagna | |
| 2006/0021031 | A1 | 1/2006 | Leahy | |
| 2006/0041508 | A1 | 2/2006 | Pham | |
| 2006/0041754 | A1 | 2/2006 | Hind | |
| 2006/0080437 | A1 | 4/2006 | Lake | |
| 2006/0123464 | A1 | 6/2006 | Goodman | |

OTHER PUBLICATIONS

Google Advanced Search, Jan. 18, 2001, retrieved from <http://web.archive.org/web/20010202162000/www.google.com/advanced_search> on Sep. 30, 2008.*
U.S. Appl. No. 60/677,422, filed May 3, 2005 (Terence Spies et al.).
U.S. Appl. No. 10/671,319, filed Sep. 24, 2003 Delany.
U.S. Appl. No. 10/805,181, filed Mar. 19, 2004 Delany.
Neil Chou et al. "Client-side defense against web-based identity theft", printed from internet at http://crypto.stanford.edu/SpoofGuard/webspoof.pdf, Feb. 2004
Zoltan Gyongyi et al., "Combating Web Spam with TrustRank," Mar. 1, 2004. Printed from internet.

* cited by examiner

*Primary Examiner*—Vivek Srivastava
*Assistant Examiner*—Ryan J Jakovac
(74) *Attorney, Agent, or Firm*—Treyz Law Group; G. Victor Treyz; Nancy Y. Ru (57) ABSTRACT

A URL verification service is provided that is used to evaluate the trustworthiness of universal resource locators (URLs). As a user browses the world wide web, the URL for a web page to which the user is browsing is captured by the service. The URL has a second level domain corresponding to a web site. The URL verification service identifies a proposed brand that should be associated with the URL if the URL is trustworthy. The proposed brand and the second level domain are used as database queries to query a database such as a search engine database. The results of the database query are processed to determine whether the URL is legitimately associated with the URL. To ensure that the proposed brand is identified accurately, the URL verification service gathers brand information using web page content, secure sockets layer certificate content, or other web site attributes.

17 Claims, 8 Drawing Sheets

UNIVERSAL RESOURCE LOCATOR VERIFICATION SERVICES USING WEB SITE ATTRIBUTES

BACKGROUND OF THE INVENTION

This invention relates to evaluating the trustworthiness of universal resource locators (URLs) such as those associated with web pages.

The world wide web is often used for sensitive transactions such as those involved in online banking and e-commerce. In a typical scenario, a user obtains access to an account at a financial institution by supplying a valid username and password.

The popularity of online services has given rise to fraud. One type of fraud, known as "phishing," involves sending fraudulent email messages to recipients to entice them to reveal their username and password or other sensitive information to an unauthorized party. Often the content of a fraudulent email is in html format and contains graphics and text that make the recipient believe that the fraudulent email was sent by a legitimate institution. For example, the fraudulent email may contain an accurate rendition of the logo of the recipient's bank.

The text of the fraudulent email may instruct the recipient to click on an embedded web link (URL). When the recipient clicks on the web link, the recipient's web browser presents the recipient with a fraudulent web page that appears to be associated with the recipient's institution. The fraudulent web page generally contains the institution's logo and other content that makes the web page difficult or impossible to distinguish from a legitimate web page associated with the institution. The fraudulent web page also contains text that prompts the recipient to log in to the institution by supplying appropriate credentials such as a username and password. When the recipient clicks on a login button on the fraudulent web page, the recipient's username and password are transmitted to the perpetrator of the fraud. The user credentials that have been fraudulently collected in this way may then be used to make unauthorized transactions at the recipient's institution.

It is therefore an object of the present invention to provide ways in which to help prevent fraud by verifying whether URLs are legitimate.

SUMMARY OF THE INVENTION

A URL verification service is provided that determines whether URLs are associated with legitimate or fraudulent web sites.

As a user surfs the internet with a web browser, the user attempts to access a web page of interest using its universal resource locator (URL). The URL may appear to be legitimately associated with a brand. For example, the URL may contain the name that appears to be the name of the user's bank.

To determine whether the brand and the URL are legitimately associated or whether the URL is associated with a fraudulent web page in an attempt to trick the user, the URL verification service evaluates the trustworthiness of the URL. The URL verification service evaluates the URL and its association with the brand using a search engine or other suitable database query engine. By providing appropriate query terms to the search engine, the URL verification service can determine whether the URL is popular and whether the web site associated with the URL is strongly associated with the brand. These characteristics reveal whether the URL is legitimate.

URL verification accuracy is enhanced by correctly identifying a brand name that is used for the search engine analysis. A proposed brand is identified that is thought to be legitimately associated with the URL. It is sometimes possible to extract the proposed brand directly from the second level domain portion of the URL. In situations in which the proposed brand contains multiple words, acronyms, and symbols, it may not be possible to accurately extract the brand in this way. The URL verification service therefore uses ancillary information to help correctly identify the proposed brand.

Ancillary information for verifying a URL may be extracted from the content of the web page associated with the URL or other attributes of the web site associated with the URL such as secure sockets layer (SSL) certificate information. These web site attributes are separate from the URL itself, but when used with the URL, allow the brand to be accurately identified. Web page content may, for example, be web page title information, copyright information, or meta-tagged information that contains the proposed brand. A typical web page title might, as an example, include a text string that contains the name of the proposed brand and additional text. By comparing the page title or other web site attributes and the URL, the URL verification service can identify a proposed brand that is likely associated with the URL. This proposed brand and information from the URL can then be processed to determine whether they are legitimately associated.

If verification operations reveal that the URL and brand are not legitimately associated, the user can be warned and the requested web page may be blocked. If it is determined that the URL and brand are legitimately associated, the user can be notified accordingly.

Further features of the invention, its nature and various advantages will be more apparent from the accompanying drawings and the following detailed description of the preferred embodiments.

DETAILED DESCRIPTION OF THE PREFERRED EMBODIMENTS

The present invention relates to systems and methods for ascertaining whether universal resource locators (URLs) and the web pages and web sites associated with the URLs are legitimate or fraudulent.

URLs are typically associated with web pages and the invention is described in the context of web pages for clarity. In general, however, URLs may be used as links to any suitable resource. If a URL for a web page is determined to be fraudulent, the web page and web site associated with that URL are also fraudulent, so the URL verification process is sometimes referred to as a "web page" or "web site" authentication process.

In accordance with the present invention, URL authentication operations are performed using a URL verification service. The URL verification service is implemented on a system that runs one or more URL verification engines and associated software components.

Both client-oriented and server-based architectures can be used for the URL verification service. With a client-based architecture, a URL verification engine runs locally on a user's computer. With a server-based architecture, a URL verification engine runs on a remote server that interacts with a user's client over the internet.

As a user surfs the internet, the user identifies a URL of interest and attempts to access the web page associated with that URL. The user may, for example, click on a link in an email message or may follow a link embedded in a web page or other document. The URL verification engine processes the URL and related information such as the content of the web page associated with the URL to determine the authenticity of the URL. The user is then notified of the results of the verification operation. If the web site is legitimate, the user can continue to surf the internet. If the web site is fraudulent, the user can be warned or other suitable actions taken. A URL is authentic if the brand such as the name of an organization that appears to be associated with the URL is in fact legitimately associated with the URL. A web site that appears to be associated with a particular brand, but which is actually associated with a perpetrator of a fraud is fraudulent, because the site and its URL are not legitimately associated with the brand.

Figure 1:
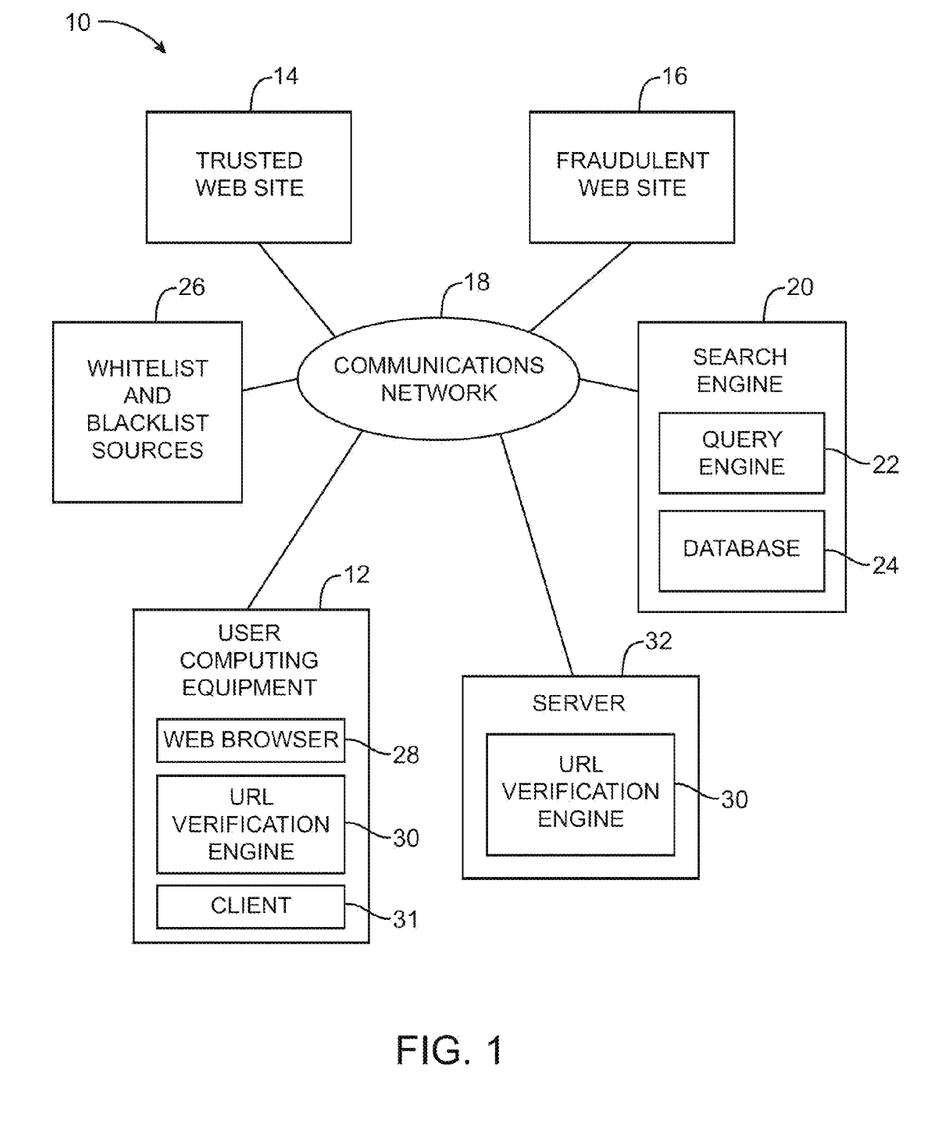
FIG. 1 is a diagram of an illustrative web site verification system in accordance with the present invention.

An illustrative system environment in which a URL verification service may operate in accordance with the present invention is shown in FIG. 1. Users in system 10 have computing equipment 12. A web browser 28 and a URL verification engine 30 operate at equipment 12. The computing equipment 12 may be used to access trusted web sites 14 and fraudulent web sites 16 over communications network 18 (e.g., the internet).

One or more Internet search engines 20 or other suitable database entities are used to provide information for evaluating URL authenticity. Each search engine 20 has a query engine 22 and a database 24. Search engine 20 uses query engine 22 to query database 24 in response to search requests and other requests made over communications network 18.

Entities such as the American Banking Association and other parties may serve as sources 26 of whitelists and blacklists. Whitelists contain information identifying trusted websites and associated entities. Blacklists contain information identifying fraudulent websites.

A URL verification server 32 uses a URL verification engine 30 to perform URL verification operations. A user at computing equipment 12 (e.g., a user at computing equipment 12 without a complete local copy of a URL verification engine 30) can interact with server 32 over network 18. A local software component at a user such as client 31 of FIG. 1 may, for example, send URL verification requests to server 32. Such requests may be sent for each URL that the user browses to or may be sent in connection with only certain URLs (e.g., URLs whose trusted/untrusted status is determined to be uncertain after local preprocessing). For example, client 31 may perform preprocessing operations on each URL such as comparing the URL to a cache (e.g., a cache of previous verification results indicating which URLs are legitimately associated with which brands), comparing the URL to whitelists and blacklists to determine whether the URL is known to be trusted or untrusted, prefiltering the URL by examining the URL for suspicious features, etc. If the preprocessing operations indicate that the URL's status is uncertain, the client 31 may send the URL verification request to server 32. In response to verification requests from users, server 32 interacts with search engine 20 to determine whether URLs are fraudulent. The client 31 and engine 30 on equipment 12 may be provided as a browser plugin, as an integrated portion of web browser 28, as a stand-alone application, or using any other suitable arrangement.

When a server-based arrangement is used for the verification service, client 31 and web browser 28 interact as a user surfs the internet. The client 31 transmits information to URL verification server 32 such as all of the URLs to which the user is browsing or a subset of those URLs such as those URLs that local preprocessing operations by client 31 have not been able to classify as trusted or untrusted (e.g., by verifying their legitimate association with a brand). The URL verification server 32 works with search engines 20 to evaluate the authenticity of the URLs received in the verification requests from client 31. The URL verification server 32 then notifies the URL verification client 31 of the results of the authentication process, so that the client 31 can notify the user accordingly.

Figure 2:
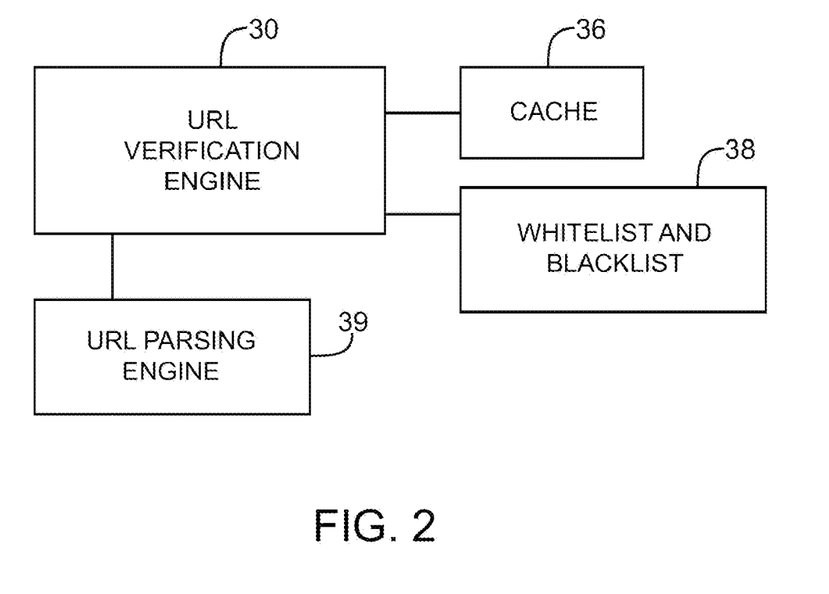
FIG. 2 is a diagram showing how a URL verification engine of the type used in the system of FIG. 1 may interact with other system components in accordance with the present invention.

As shown in FIG. 2, local and server-based verification engines 30 can consult cache 36 and actively-maintained whitelists and blacklists 38 in performing authentication operations. In server-based arrangements, the cache 36 and lists 38 may be maintained at the server 32, at the user computing equipment 12 (e.g., client 31), or at both server 32 and equipment 12. For example, cache 36 and/or lists 38 may be maintained at equipment 12 for consultation during browsing operations. If the client 31 is not able to ascertain the status of a particular URL by consulting the cache 36, examining lists 38, or performing prefiltering operations to identify suspicious features (or if all or any subset of these operations fail to indicate the status of the URL), client 31 can send a URL verification request to server 32.

Other architectures are also possible. For example, cache 36 may be maintained locally at user computing equipment 12 while lists 38 may be maintained at server 32 or cache 36 may be maintained at server 32 while lists 38 may be maintained at user computing equipment 12. Cache and lists may be divided. For example, cache and/or lists may be maintained at computing equipment 12 at the same time that the same or different cache and/or lists are maintained at server 32. Prefiltering software that is used to examine URLs for suspicious features may also operate at equipment 12 and/or server 32 (e.g., in combination with cache and whitelists and blacklists). Combination of these arrangements may also be used.

Lists 38 may contain information from sources 26 oh whether certain URLs are trusted or untrusted. Lists 38 may be maintained at user computing equipment 12 and/or a server such as server 32. Cache 36 may be implemented using memory and storage devices in the computing equipment on which the verification engine 30 and/or client 31 is operating. Information such as the results of URL verification operations may be stored in cache 36. The results may include, for example, a list of which brands have been determined to be legitimately associated with which URLs and/or second level domains. During subsequent URL verification operations, the contents of cache 36 may be consulted to help determine whether a URL is authentic (e.g., by determining that a brand that appears to be associated with the URL has previously been determined to be legitimately associated with the URL's second level domain). Using cache 36 may reduce the computational burden that would otherwise be imposed on a system without cache capabilities and may therefore improve system performance.

Locally-implemented URL verification engines such as URL verification engine 30 in user computing equipment 12 may obtain a copy of the URL of the web page that the user is currently viewing from a web browser 28 (FIG. 1). The current URL can be parsed into components using the URL parsing capabilities of the web browser 28 or any other suitable URL parsing engine 39. In a server-based arrangement, URL verification engine 30 on URL verification server 32 may include the URL parsing capabilities of engine 39. In general, cache 36, actively maintained whitelist and blacklist 38, and URL parsing engine 39 may be implemented on user computing equipment such as computing equipment 12 and/or remote servers such as server 32 or any other suitable computing equipment.

Computing equipment 12 may be a personal computer, a workstation, a portable computing device such as a handheld computer, laptop, cellular telephone, or any other suitable computing device or network of such devices. The other entities in FIG. 1 such as sources 26, web sites 14 and 16, search engine 20, and URL verification server 32 may be provided using one or more servers or using any other suitable computing equipment arrangement. There may be a one-to-one correspondence between the entities and servers in system 10 or the entities of system 10 be provided using a distributed computing arrangement using multiple computers. For example, search engine 20 may be implemented using a cluster of servers. When multiple computers are used to support an entity's operations, the computers may be located at the same location or may be networked together using communications network 18. Network 18 may be any suitable wired and/or wireless network (e.g., the internet).

A user at computing equipment 12 uses a web browser 28 to surf the internet. There are generally numerous users in system 10.

In evaluating whether a web page's URL is associated with a trusted web site, the verification service may determine whether the URL has a valid top level domain. Information on which top level domains are valid may be stored as a list (e.g., as part of lists 38 or in any other suitable database structures).

With the arrangement shown in FIG. 1, software for implementing the URL verification service may be implemented on user computing equipment 12 as a built-in browser component or as a browser plug-in (e.g., URL verification engine 30) or may be implemented on equipment 12 and 32 (e.g., as a local URL verification client 31 and associated server-based URL verification engine 30). Search engine database query operations for supporting the URL verification service may be implemented using the database 24 and the database query engine 22 running at search engine 20. Any suitable number of search engines 20 may be included in system 10. When multiple search engines 20 are used, URL verification engine 30 may aggregate query results from the search engines to improve performance and provide redundancy.

Trusted web sites that a user may visit may include financial institutions such as the user's bank. During a typical online banking transaction, the user enters username and password information into a web page (a web "form"). When the user clicks on a login button or other suitable on-screen option, the contents of the web form are uploaded to the user's bank at site 14. The user's bank authenticates the user by comparing the uploaded username and password information to account information stored at the bank. If the user's username and password match the bank's account records, the user is permitted to access the user's bank account. The user may then withdrawal and transfer funds and perform other financial transactions.

Effective security in this type of system is dependent on the user guarding the secrecy of the username and password information. If the user can be tricked into revealing the username and password information to an unauthorized party, the unauthorized party may obtain access to the user's bank account.

One type of attack that may be used to attempt to trick the user into revealing the sensitive information such as username and password credentials is the so-called phishing attack. With a phishing attack, an attacker attempts to trick a user into revealing the user's secret information by masquerading as a trusted entity such as the user's bank. For example, the attacker may send an email to the user that purports to be a security alert from the user's bank. The email may contain the bank's logo and text that instructs the user to click on a web link. When the user clicks on the web link, the user's browser takes the user to a fraudulent web site 16, which directs the user to upload the user's secret information for an apparently legitimate purpose. To help trick the user, the attacker may use a URL for site 16 that looks similar to the URL of trusted web site 14.

As an example, the user may have an account at ABCD Bank. The URL of the legitimate web site 14 associated with ABCD bank may be www.abcdbank.com. In order to effectively trick as many people as possible, the attacker may create a fraudulent web site 16 with a URL of www.abcdbank.com.pqrst.com, where pqrst.com in this example is the second level domain associated with the attacker's fraudulent web site 16. Because the fraudulent URL appears to be associated with ABCD Bank to a casual observer, the user may be misled into believing that the user is at the web site of ABCD Bank and may not realize that the user's browser has in fact taken the user to the web site 16 of the attacker. If the user subsequently follows the instructions provided by the fraudulent web site 16 (e.g., to provide the user's username and password information for an apparently legitimate purpose), the username and password information will be uploaded to the attacker at fraudulent web site 16. The attacker can then use this information to obtain unauthorized access to the user's account at ABCD bank.

To overcome phishing attacks and other social engineering attacks that attempt to trick the user into revealing secret information, the URL verification service of the present invention evaluates the authenticity of web page URLs and their associated web sites during user browsing sessions. If a user attempts to view a web page associated with a web site that is known to be untrusted, the user may be warned and the web page may be blocked or other appropriate action taken.

If the authenticity of the web site is not known, the URL of the web page is used to evaluate the web page's and site's authenticity. In evaluating whether a URL and the web site with which that URL is associated are to be trusted, the URL verification engine 30 on the user's equipment 12 communicates with search engine 20 or the URL verification client 31 communicates with URL verification server 32, which in turn communicates with search engine 20. The data provided by search engine. 20 is used by the URL verification engine 30 in determining whether the URL and web site are legitimate. The results of this determination are provided to the user at URL verification client 31 or engine 30 on equipment 12 over network 18.

One of the inputs provided to the search engine 20 by the URL verification engine 30 is the brand that is believed to be associated with the web site (e.g., the name of the bank or other organization that appears to own the web site). Brand information may be extracted from the URL of the web page by processing the URL using information such as the second level domain of the URL, web page content associated with the URL, or secure-sockets layer (SSL) certificate content associated with the web site corresponding to the second level domain.

With one suitable approach, a multi-phase arrangement is used to verify the URL. In a first phase, the URL is checked for suspicious features and an attempt is made to verify the URL based on a proposed brand extracted from the second level domain of the URL. If verification operations using the proposed brand obtained from the first phase are not conclusive, additional verification operations are performed in a second phase. In the second phase, web page content such as title bar information, copyright information, and meta tag information and/or SSL certificate information such as a certificate's organization name or common name is used to help extract a more accurate proposed brand from the URL. Verification operations are then performed using the second-phase version of the proposed brand. Because the two-phase brand extraction process tends to be highly accurate, this approach helps to reduce the likelihood of false warnings.

During verification operations, the URL verification engine 30 uses information on the web page's URL and the proposed brand as inputs to query the search engine 20. Using the information provided by the search engine 20 in response to these inputs, the URL verification engine 30 determines whether the URL is legitimately associated with the brand ("ABCD Bank" in the present example). The URL verification engine 30 may then notify the user of the results of the URL evaluation process (directly if engine 30 is running locally on equipment 12 or through client 31 if engine 30 is running on server 32). The user can be notified of the results of the URL evaluation process by displaying a confirmation message indicating that the URL is legitimately associated with the brand or by displaying a warning that the URL cannot be verified. Other notification arrangements may also be used if desired. For example, the web pages associated with unverified URLs may be blocked or other protective actions may be taken as part of a notification scheme.

Figure 3:
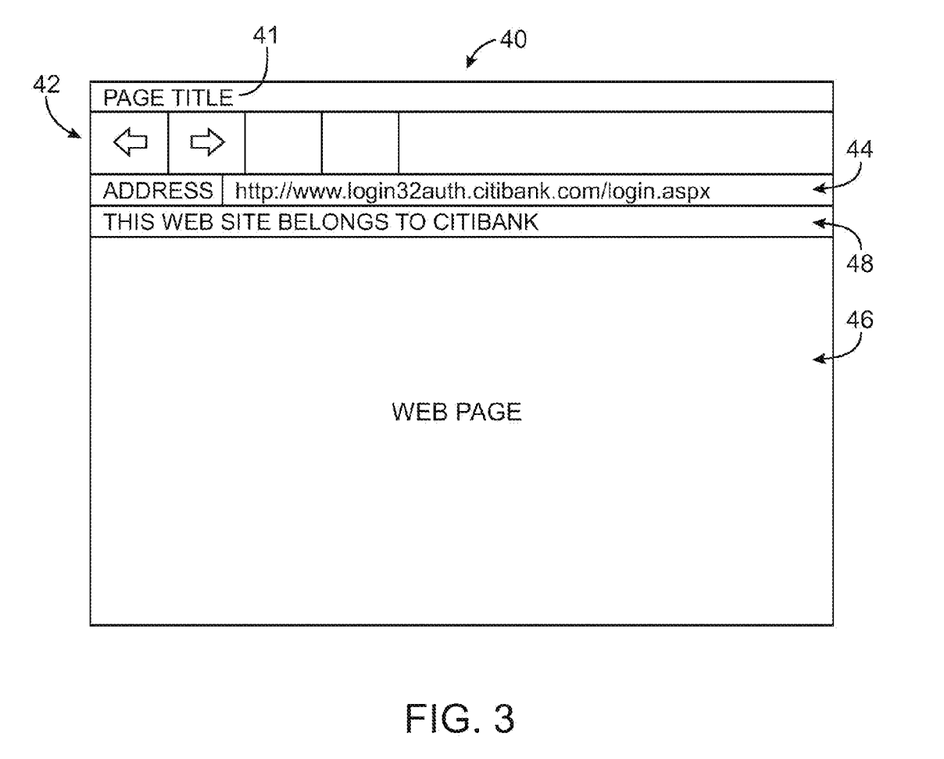
FIG. 3 shows an illustrative display screen that may be presented to a user when the user visits a web page that is legitimately associated with a trusted brand in accordance with the present invention.

Any suitable user interface may be used to notify the user of the results of URL verification operations. As an example, when the URL verification service determines that a given web page is part of a valid web site, a screen such as screen 40 of FIG. 3 may be displayed for the user at computing equipment 12. Screen 40 contains web browser buttons 42. Region 44 is used to display the URL of the current web page. The corresponding web page is displayed in region 46 by the web browser 28. A message may be displayed in region 48 to inform the user of the trusted status of the URL. The message may be, for example, message generated by the URL verification engine that is displayed in a browser bar format as shown in FIG. 3. Valid status information may also be conveyed using icons or other visual indicators on an available portion of the display. If desired, audio messages may be used to notify the user.

The message displayed in region 48 may contain information on the brand that the URL verification service has determined is legitimately associated with the URL in region 44. In the example of FIG. 3, the URL in region 44 was legitimately associated with the bank "Citibank," so the message in region 48 informs the user that the web page is part of a web site associated with Citibank. If the user does not recognize the brand listed in region 48 or has other concerns, the user can take appropriate corrective actions.

Figure 4:
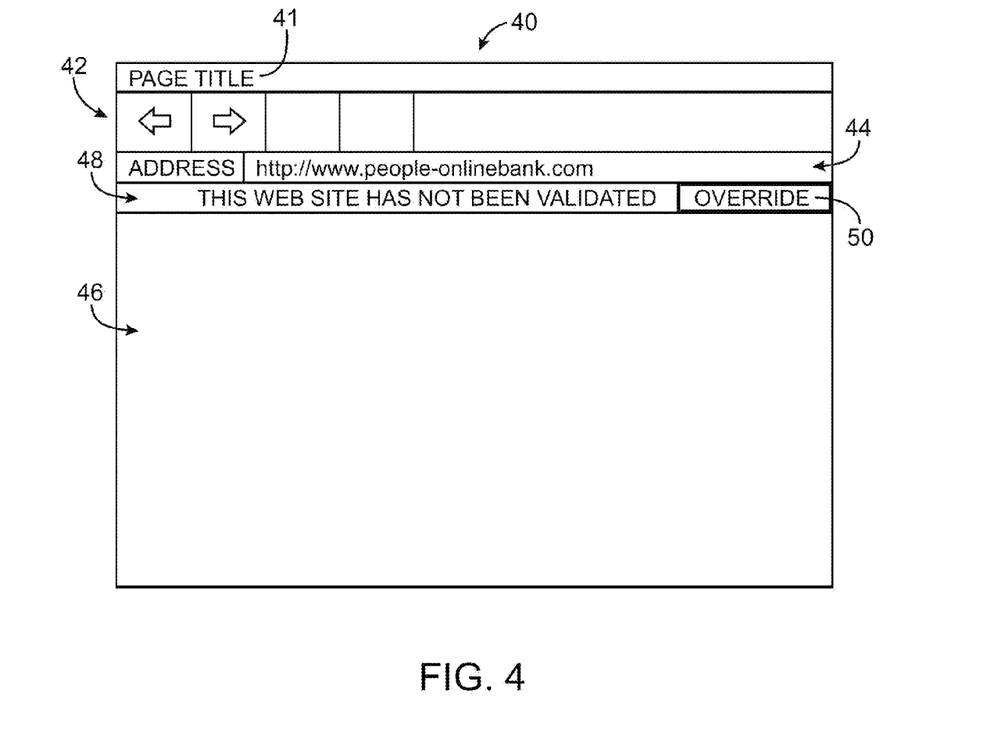
FIG. 4 shows an illustrative display screen that may be presented to a user when the user attempts to visit a web page that is not legitimately associated with a trusted brand in accordance with the present invention.

When the URL verification service determines that a given web page is from a fraudulent web site 16 or is suspicious, the verification results message provided to the user includes a warning. As an example, a screen such as screen 40 of FIG. 4 may be displayed on the user's computing equipment 12. In screen 40 of FIG. 4, web browser buttons are displayed in region 42. Region 44 contains the URL of the unverified web page. Because the URL verification service was unable to verify that the web page URL is authentic, a warning is being displayed in region 48. In addition to or instead of displaying the warning in region 48, a warning icon or other visual indicator may be displayed or an audio alert may be generated to indicate that the URL in address region 44 is untrusted. In the example of FIG. 4, the web page corresponding to the URL of region 44 has been blocked and is therefore not being displayed in region 46. If desired, the untrusted web page could be displayed, particularly if sufficient warning is provided using warnings such as the warning of region 48.

Sometimes a user may desire to override the determination made by the URL verification service. For example, if a URL is associated with an obscure brand, the URL verification service may not be able to ascertain the URL's validity. Nevertheless, if the user believes that the URL is valid, the user can direct the URL verification service to add the URL and/or its associated web site to a list of trusted URLs/sites. For example, the user can direct the URL verification service to treat the URL as trusted by clicking on an override button. If the web page for the URL of region 44 was being blocked, clicking on an override button will direct the service to allow the user's web browser 28 to display the web page in region 46.

As the user surfs the web, the URL verification service can capture URLs (e.g., from browser 28). The captured URLs can be processed locally on equipment 12 or can be transmitted over network 18 to server 32. The URL verification service can automatically extract the proposed brand from the captured URL.

The process of evaluating whether a given URL is legitimately associated with a brand involves parsing the URL into its constituent components (top level domain, second level domain, etc.). Web browser 28 contains a URL parsing engine that the URL verification service can use for URL parsing. The URL verification service can also use other parsing arrangements. For example, a URL parsing engine may be implemented on server 32 that is not part of a web browser.

Figure 5:
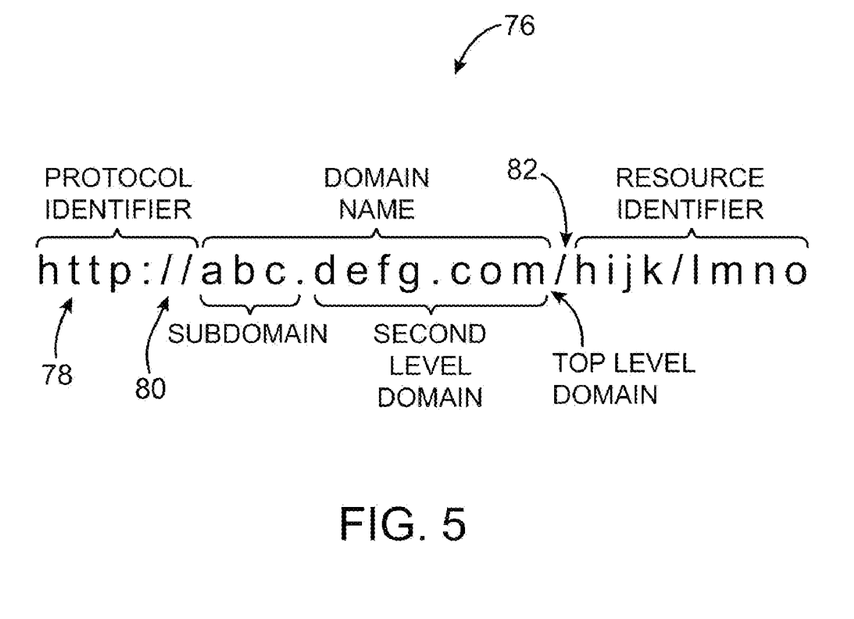
FIG. 5 is a diagram showing the components in a typical universal resource locator (URL).

The parts of a typical web page URL 76 are shown in FIG. 5. As shown in FIG. 5, the URL has an associated protocol identifier 78. Web pages are identified by the protocol identifier "http". The portion of the URL between double forward slashes 80 and the first single forward slash 82 corresponds to the URL's domain name portion. The domain name includes a top level domain such as .com, .gov, .org, etc. and a second level domain. The domain name may also include an optional subdomain portion. The second level domain is sometimes referred to as the web site address associated with the URL. Individual web pages at the site share the same second level domain, but are differentiated through the use of unique subdomains and/or resource identifiers.

Figure 6:
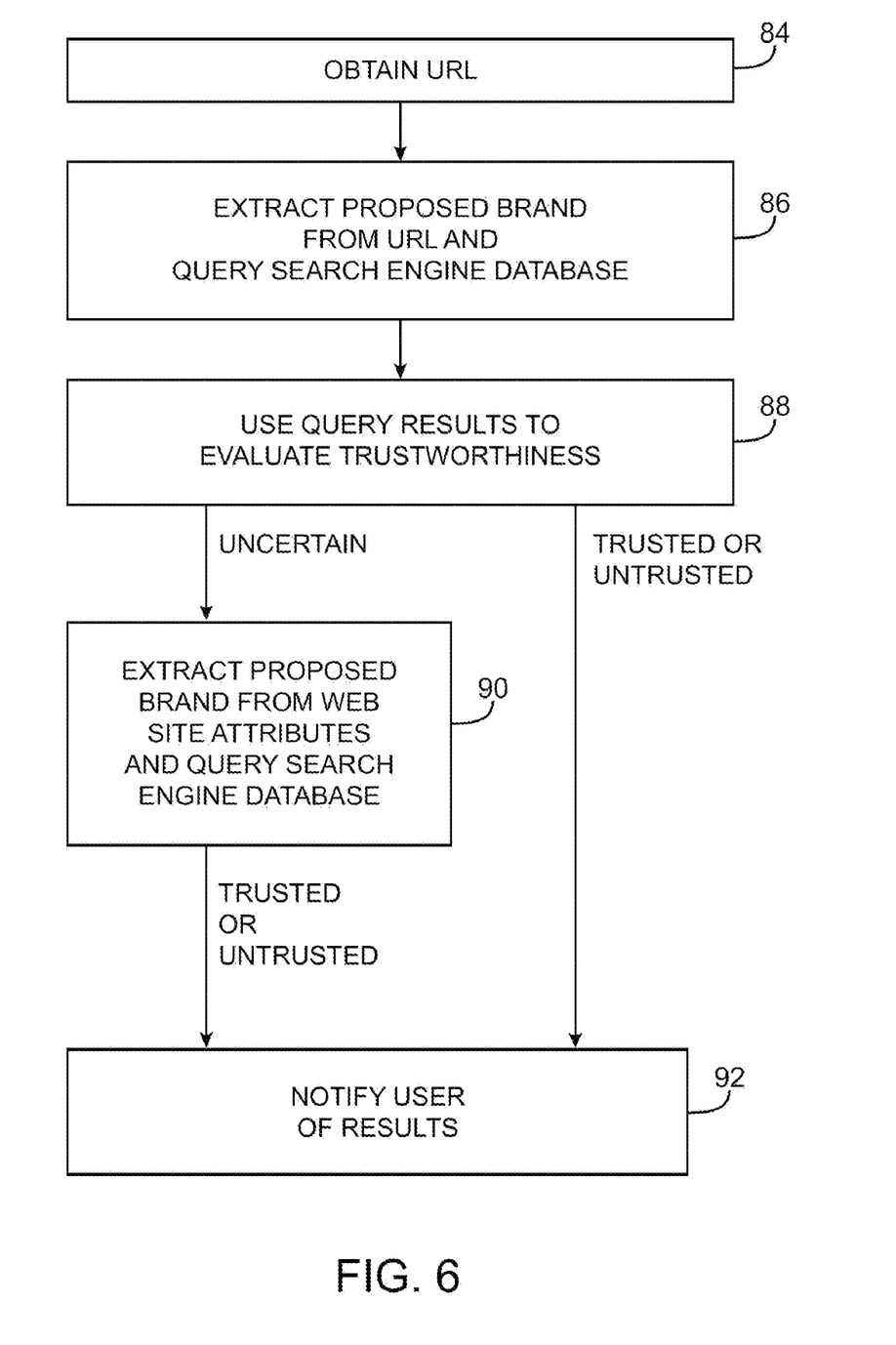
FIG. 6 is a flow chart of illustrative steps involved in ascertaining whether a URL is legitimate in accordance with the present invention.

The flow chart of FIG. 6 shows operations involved in using the URL verification service to determine whether a given URL is legitimately associated with a trusted web site.

At step 84, the service obtains the URL that the user is currently using to surf the internet. For example, the service may obtain the URL from browser 28. In a server-based architecture, the captured URL can be transmitted to the server 32 for processing.

At step 86, the service extracts a proposed brand from the URL and uses the extracted brand to query search engine 20. If, for example, the URL is www.login32auth.citibank.com/login.aspx, the service may parse the URL to obtain the second level domain "citibank.com." The service may strip the top level domain ".com" from the second level domain to produce the proposed brand "citibank". The proposed brand and the second level domain may be used as query terms when querying the search engine. For example, the search engine may be directed to produce a link count indicating how many web links point to pages at the second level domain. The search engine may also be used to produce a ranked list of web sites that contain the proposed brand. These search queries are merely illustrative. For example, a search engine query might also be used to obtain a page count indicating how many pages contain the proposed brand.

Moreover, processing tasks may be allocated between verification engine 30 and search engine 20 in a number of suitable ways. For example, with one arrangement engine 20 may produce a ranked list of web sites containing the proposed brand, which verification engine 30 consults to ascertain the position of the second level domain. With another suitable arrangement, engine 20 ascertains the position of the second level domain in the ranked list and provides verification engine 30 with a rank value, so that verification engine 30 need not consult the ranked list. In general, any suitable allocation of processing tasks between engine 20 and engine 30 may be used if desired.

At step 88, the results of the search engine query are used to determine whether the URL is legitimately associated with the proposed brand. The URL verification service may, for example, conclude that the URL is trusted if the page count is sufficiently large and if second level domain appears near the top of the ranked list (i.e., in one of the top five positions). If the page count is low and the second level domain does not appear near the top of the ranked list, the URL verification service may conclude that the URL is not trusted. The user can be notified that the URL is trusted or untrusted at step 92.

If the URL verification service determines that the page count is high but that the position of the second level domain is not near the top of the ranked list or if the URL verification service determines that the second level domain is near the top of the ranked list but that the page count is low, the status of the URL is uncertain. Accordingly, the URL verification service can perform additional URL verification operations at step 90. During step 90, the URL verification service can use additional information associated with the URL to attempt to ascertain which brand it might be legitimately associated with.

There are several circumstances under which it is difficult to correctly extract a proposed brand from a URL.

For example, the URL may contain a number of words that have been run together by removing the spaces that would normally separate the words. The URL for "Bank of America" might be "bankofamerica.com." Particularly in situations involving three or more words that have been run together, the search engine 20 may not be able to recognize that spaces are missing. Unless the URL verification service is able to extract the proposed brand "Bank of America" from "bankofamerica.com" to use as an input to the search engine, the results from the search engine will not be accurate.

As another example, the URL might contain an acronym. The URL for the web site of the Long Beach Playhouse might be www.lbph.com. Using the term "lbph" as the proposed brand may not produce accurate results.

Another example relates to URLs that contain numbers or symbols. Often URLs will contain numeric or symbolic shorthand. The word "first" might be represented as "1st" in a URL or the word "and" might be represented by the "+" symbol in a URL. Unless these linguistic substitutes can be identified, the correct proposed brand cannot be identified from the URL.

The URL verification service of the present invention overcomes these obstacles during step 90 by using web site attribute information to improve the brand extraction process. By correctly extracting the brand from the URL, even in conditions in which the URL is missing spaces, contains an acronym, or contains linguistic substitutions, the URL verification engine is able to query the search engine accurately. The results of the search engine query can then be used at step 90 to determine whether the URL is trusted or untrusted. The user is notified accordingly at step 92.

Any suitable arrangement may be used to enhance the accuracy of the brand extraction operations of step 90. With one suitable approach, the URL verification service obtains web page content associated with the URL. Web pages at legitimate sites typically include a page title. In a browser such as Microsoft's Internet Explorer web browser, the page title is displayed above the browser controls at the top left of the user's screen, as shown by page titles 41 in FIGS. 3 and 4. In the corresponding html of the web page, the page title is located between a pair of title tags.

The page title for the web pages of a legitimate institution often contains the name of the institution. This characteristic of legitimate web pages can be exploited by the URL verification service. During step 90, the URL verification service may obtain the page title from the web page associated with the URL (e.g., "Bank of America|Home|Personal"). The URL verification service can then remove any spaces or extraneous characters from the URL (e.g., to produce the string "bankofamerica|home|personal"). By comparing this string to the second level domain, the URL verification service can correctly identify the brand "Bank of America" that is associated with the URL.

The use of page title information from the web page corresponding to the URL is merely illustrative. Other web page content may also be consulted when identifying the proposed brand. For example, page content such as meta tag content, copyright information (which is typically contained in a web page footer), or other web page content may be used. Moreover, a secure web site will provide a user's browser with an SSL certificate as part of the process of creating an SSL link between the browser and the web site. The authenticity of the SSL certificate is authenticated by a certificate authority. SSL certificates contain "organization name" and "common name" fields that identify the organization associated with the certificate. The organization name and common name are additional examples of web site attributes that may be used to help extract the correct brand from the URL.

In the example of FIG. 6, the URL verification process takes place in two phases. First, the proposed brand that is extracted from the URL without using any web site attributes is used as part of a search engine query and the query results are evaluated (step 86 and 88). Second, if the results of the URL evaluation of the first phase are uncertain, a web site attribute (e.g., page title, SSL certificate organization name, etc.) is used to extract a more accurate version of the proposed brand for use in evaluating the URL (step 90). This type of two-phase arrangement is merely illustrative. For example, more than two phases can be used (e.g., additional phases can be used that each exploit a different web site attribute) or all of the brand extraction processes can be performed as part of a single phase. Moreover, supplemental brand extraction and evaluation phases need not only be performed when the results of a previous phase leave the status of the URL as uncertain. For example, the operations of step 90 could be performed after step 88, so long as the brand was not found to be trusted. Evaluating URLs that are suspected of being untrusted using supplemental brand extraction and evaluation operations such as the operations of step 90 helps to improve accuracy.

Figure 7:
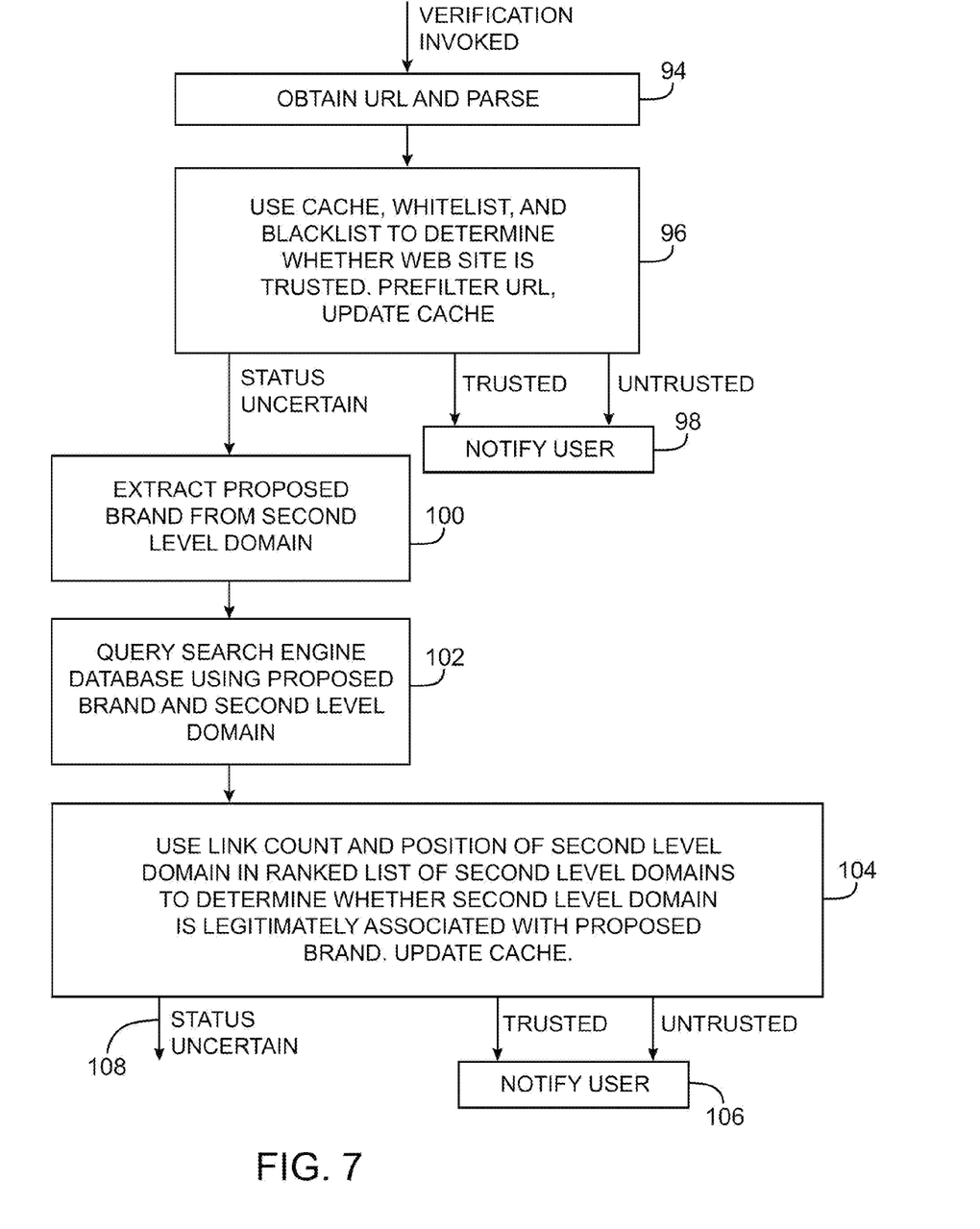
FIGS. 7 and 8 contain a more detailed flow chart of illustrative steps involved in ascertaining whether a URL is legitimate in accordance with the present invention.
Figure 8:
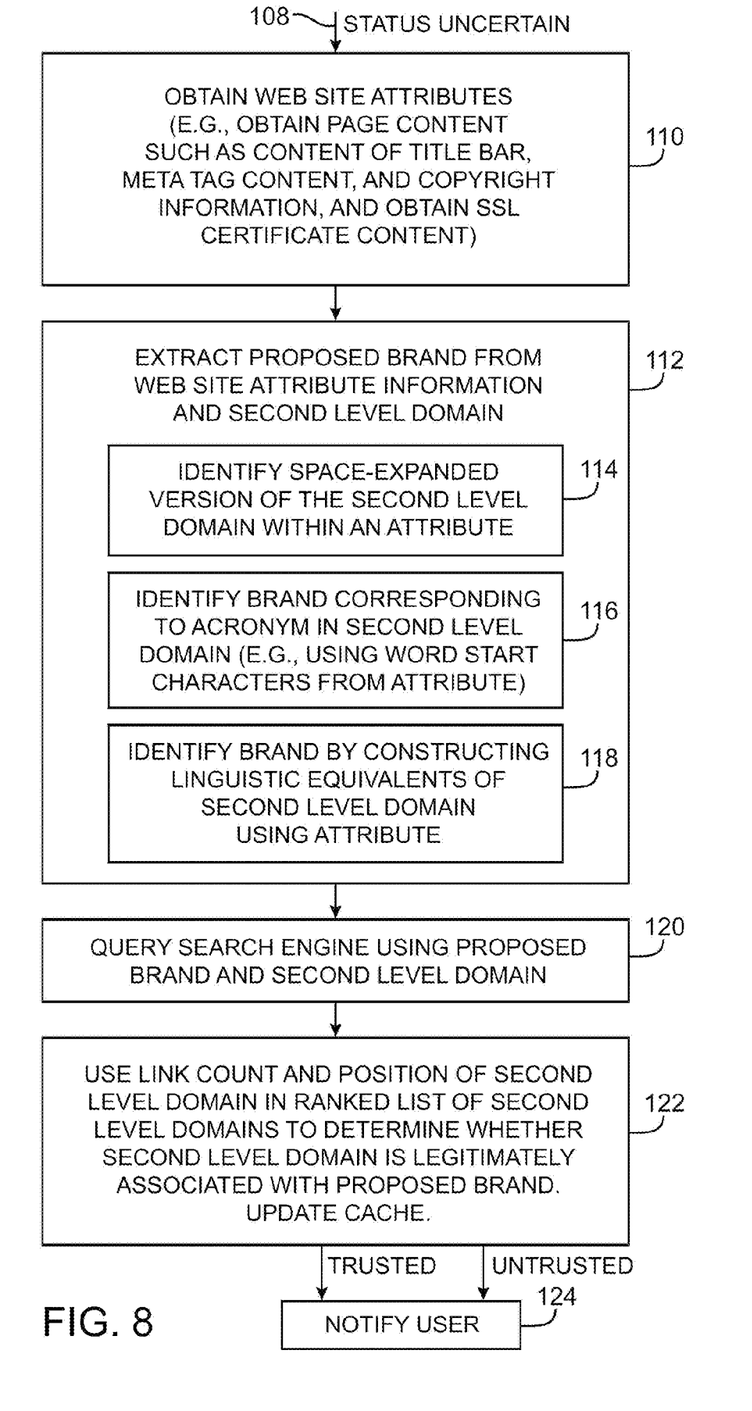

FIGS. 7 and 8 contain a more detailed flow chart of steps involved in using an illustrative embodiment of the URL verification service to authenticate a URL.

If desired, the URL verification service can be invoked manually. Preferably, the URL verification service operates automatically in the background as a user surfs the web with browser 28 (FIG. 1). As the user browses to a web page, the URL verification engine 30 is automatically invoked if it is not already operating.

As indicated by step 94 of FIG. 7, the URL verification engine 30 obtains a copy of the URL for the web page to which the user is browsing and parses the URL into its constituent components. The URL can be obtained from the web browser 28 by client 31 and uploaded to engine 30 at server 32 if engine 30 is operating on server 32. Alternatively, the URL can be provided to engine 30 from web browser 28 and processed by engine 30 on user equipment 12.

Engine 30 can parse the URL using the internal parsing capabilities of engine 30 or using the URL parsing functions of associated software components such as web browser 28. URL parsing operations may be performed using a URL parsing engine compliant with RFC 2396 (Uniform Resource Locators) of the Internet Engineering Task Force (IETF). The URL components that are produced during the parsing operation include a domain name, a second level domain, a top-level domain, and potentially one or more subdomains (see FIG. 5).

At step 96, the URL verification engine 30 can consult cache 36 (FIG. 2). Cache 36 preferably contains a list of second level domains (web site addresses) that are known to be trusted or untrusted from previous verification operations. Cache 36 may also contain information on known legitimate associations between brands and second level domains. Storing these results in cache 36 improves performance and obviates the need for additional processing. URL verification engine 30 can also consult actively maintained whitelist and backlist 38 to determine whether the URL is trusted. The whitelist may be a list of URLs and/or domain names, or other URL components that identify trusted web pages, web sites, and the entities associated with these sites. The whitelist may include, as an example, the second level domains for all known legitimate banks and the brand names of those banks, as published by a trusted whitelist source 26 such as the American Banking Association. The blacklist may include, as an example, a list of second level domains associated with fraudulent websites. The blacklist may contain information from a security service or other party that maintains information on the operators of fraudulent web sites 16. The whitelist and blacklist 38 are preferably actively maintained (e.g., by an administrator at server 32 that uses tools at server 32 to add, delete, and edit whitelist and blacklist entries).

In using cache and the whitelist and blacklist information to determine whether or not a URL is trusted, all or a portion of the URL may be compared to the cache, the whitelist, and the blacklist. In one suitable arrangement, the URL verification engine 30 maintains a local database in cache 36 that contains mappings between second level domain names (e.g., wellsfargo.com) and corresponding brands (e.g., Wells Fargo), and maintains a list of untrusted sites (h4x0rsRUs.com).

During step 96, if the URL verification engine 30 is unable to determine the status of the URL based on the contents of the cache 36 and lists 38, prefiltering operations may be performed on the URL. In particular, the URL verification engine 30 can examine the URL for features that are known to be suspicious and not normally associated with legitimate commercial sites. Any suitable URL characteristics may be considered when using the URL verification engine 30 to determine whether the URL is suspicious during the prefiltering operations. As an example, use of a numeric form URL or a URL containing an @ form indirection may be considered untrustworthy. An illustrative numeric form URL is http://145.67.42.1/login.aspx. An illustrative URL containing an @ form indirection is http://www.bank.com/login.aspx@phisher.com. In this type of URL, the actual web site to which the user is directed is phisher.com, rather than bank.com. Numeric form URLs and URLs with @ form indirections are typically only used in development projects or while sites are under construction. In these situations, sophisticated users can ignore or override warnings provided by the URL verification engine 30.

During the prefiltering operations of step 96, the URL verification engine 30 determines whether the top level domain of the URL is trusted. In performing this operation, the URL verification engine 30 may consult a list of valid top level domains. The list used to validate the top level domains may be the list of valid top level domains published by the Internet Assigned Numbers Authority (IANA) or may be based on an IANA list. If the top level domain of the URL does not appear in the list of valid top level domains, the URL verification engine 30 can conclude that the URL is untrusted. If the results of consulting the cache 36 and the lists 38 and the prefiltering operations of step 96 reveal that the URL is trusted or reveal that the URL is untrusted, the user can be notified accordingly at step 98. If desired, user equipment 12 (e.g., using client 31) may perform some or all of the preprocessing operations of step 96 on the URL (such as using the URL to consult a cache of previous URL verification results at equipment 12) to determine whether or not to send a URL verification request to server 32 (e.g., because the status of the URL as trusted or untrusted is uncertain).

If the status of the URL is uncertain, additional processing may be performed at step 100. During step 100, the brand that appears to be associated with the URL (the "proposed brand") may be automatically extracted from the domain name. The proposed brand is the brand that should be legitimately associated with the URL of the web page that the user is interested in visiting. As an example, engine 30 may extract the proposed brand "Citibank" from a URL containing the second level domain "citibank.com" by discarding the ".com" suffix (i.e., by discarding the top level domain portion of the second level domain). Some second level domain formats require that additional information be stripped when extracting the proposed brand. For example, a web site in the United Kingdom that is associated with the United Kingdom branch of Barclays bank may have a second level domain of "barclays.co.uk". In this type of situation, both the top level domain ".uk" and the company suffix ".co" are stripped from the second level domain by the URL verification engine 30. Brand extraction operations such as this may supported by including supplemental information in a valid top level domain name list maintained by engine 30. URL verification engine 30 can use this supplemental information in extracting the proposed brand.

After extracting the proposed brand at step 100, the URL verification engine 30 uses the second level domain from the domain name and the proposed brand as inputs to the search engine 20 at step 102.

During step 102, the URL verification engine 30 formulates a database query for search engine 20 that uses the second level domain. The query asks the search engine 20 to use query engine 22 to query database 24 to determine how many web links exist to the second level domain (i.e., to the web site defined by the second level domain). The count of the number of links to the second level domain is used by the URL verification engine as an indicator of centrality. The link count is used to indicate the degree to which other web sites and pages link to the web site associated with the URL of unknown authenticity. If desired, the search engine 20 may take into account the centrality of the linking sites in determining the centrality of the second level domain. With this type of approach, links from blogs and untrustworthy machines are not included in the link count and will therefore not undesirably skew the measure of centrality. Because attackers generally construct their fraudulent sites 16 so that they will go unnoticed and be difficult to locate and shut down, the URL verification engine 30 preferably requires a sufficient level of centrality for a site to be considered trustworthy.

During step 102, the URL verification engine 30 also uses the proposed brand as an input to search engine 20. In particular, the URL verification engine 30 queries the search engine 20 using the proposed brand as an query term (input) for use by query engine 22 in querying database 24. The query made to the search engine 20 directs the search engine 20 to produce a ranked list of which second level domains have pages that contain the proposed brand. If desired, additional queries may be made using the proposed brand. As an example, a query may be made that directs the search engine 20 to return a count of how many web pages contain the proposed brand (e.g., the text string "Citibank"), which gives further information on the legitimacy of the proposed brand.

The queries of step 102 may be performed as a single query or multiple queries. An example of a search engine that supports the queries of step 102 is the Google internet search engine of Google, Inc.

Some brands contain two words (e.g., Wells Fargo). An incorrectly spelled or incorrectly formatted brand (e.g., wellsfargo) can be converted into a correctly spelled and formatted brand (e.g., Wells Fargo) using a spell checker function associated with search engine 20. The correct spelling and format for the brand may be used, for example, when the URL verification server 32 provides the extracted brand to the URL verification client 30 to display for the user. The correct spelling and format for the brand may also be used when using query engine 22 to query database 24 during the process of evaluating the authenticity of the URL.

The format for the search engine queries depends on the type of search engine interface (API) being used. With one suitable approach, the search engine is initially queried for an improved spelling for the proposed brand. If an improved spelling is identified by the search engine, the proposed brand with the improved spelling may be used to query the search engine. With another suitable approach, the proposed brand is used to query the search engine without specifically requesting an improved spelling. In response to the query, the search engine automatically suggests an improved spelling. If an improved spelling is suggested, it may be used to query the search engine.

The proposed brand queries of step 102 direct the search engine 20 to provide the URL verification engine 30 with a ranked list indicating, in order of popularity, the second level domains that have web pages including the proposed brand. The ranked list shows which web sites (second level domains) are most associated with the proposed brand. Any suitable number of entries may be returned in the ranked list. For example, the ranked list may include the top 5 or top 10 web sites containing the proposed brand. The position of the second level domain in the ranked list (e.g., in the top or first position, in the second position, etc.) is indicative of the legitimacy of the second level domain. Legitimate web sites will tend to appear in the top 5 or 10 positions in the ranked list. The verification engine 30 can determine the position of the second level domain in the ranked list or the search engine 20 can provide verification engine 30 with the position value.

At step 104, the link count and the position of the second level domain in the ranked list are used by the URL verification engine 30 to determine whether the second level domain is legitimately associated with the proposed brand. During step 104, the URL verification engine 30 compares the second level domain from the URL to the second level domains in the ranked list to determine the placement of the second level domain from the URL within the ranked list (e.g., at the top of the list, second from the top, in the top 5, in the top 10, etc.). If desired, search engine 20 may determine the rank of the second level domain within the ranked list and may provide the rank to the URL verification engine 30 rather than the ranked list. In this case, the URL verification engine obtains the list position of the second level domain from the search engine, rather than ascertaining the position by comparing the second level domain to the ranked list.

A high ranking in the list indicates that the web site (second level domain) associated with the URL is an authoritative site for the proposed brand. For example, it is likely that the official web site for a bank would be among the most highly ranked sites containing the bank's name. In this situation, the rank of the bank's web site in the ranked list might be number one or number two.

Any suitable computations may be used to determine whether the second level domain from the URL is legitimately associated with the proposed brand.

With one suitable approach, Boolean trust factors TI1 and TI2 are calculated using equations 1 and 2.

$$TI1=(LC>1000) \quad (1)$$

$$TI2=(RANK<6) \quad (2)$$

In equation 1, the variable LC represents the link count (i.e., the number of links to the web site corresponding to the URL). In equation 2, the variable RANK represents the rank of the second level domain within the ranked list of second level domains.

The trust factor formulas of equations 1 and 2 use Boolean logic. If the link count LC is above a user-specified or default link count threshold (1000 in this example), TI1 is 1, otherwise TI1 is 0. If the variable RANK is less than a user-specified or default rank threshold (6 in this example), the value of TI2 in equation 2 is 1, otherwise TI2 is 0.

Using the values of TI1 and TI2, the status of URL can be categorized as being (1) trusted, (2) untrusted, or (3) uncertain. If the link count is high and the second level domain appears near the top of the ranked list, TI1 and TI2 will be 1 and the URL can be considered to be trustworthy. If the link count is low and the position of the second level domain in the ranked list is not near the top of the list, TI1 and TI2 will be 0 and the URL will be untrusted. If the engine 30 concludes that the URL is trusted or untrusted, the user is notified at step 106.

If TI1 is 1 while TI2 is 0 or if TI1 is 0 while TI2 is 1, the status of the URL is uncertain. This is because situations in which the link count is high but the second level domain's position is far down on the ranked list are not conclusive. Similarly, situations in which the ranked list position of the second level domain is indicative of a trustworthy URL but the link count is low are not conclusive.

The use of equations 1 and 2 is merely illustrative. Any suitable formulas may be used to evaluate the trustworthiness of the URL during step 104. As just one example, an additional term may be added to equations such as equations 1 and 2 that reflects the popularity of the proposed brand. An illustrative additional term of this type is the term PMC >10,000, where the variable PMC represents the number of page hits containing the proposed brand and the threshold value of 10,000 represents the size of page hit count that is typically considered necessary to indicate trustworthiness.

If the URL verification engine 30 concludes that the URL status is uncertain at step 104, additional verification operations can be performed, as indicated by line 108 in FIG. 7 and the illustrative processing steps of FIG. 8. In the present example, the operations of FIG. 7 serve as a first phase of the trust evaluation process and the operations of FIG. 8 serve as a second phase of the trust evaluation process. As indicated by line 108, with one illustrative embodiment of the invention, the second phase URL evaluation operations can be performed if the first phase operations are inconclusive.

As shown in FIG. 8, second phase URL verification operations involve processing web site attributes associated with the URL. These web site attributes reveal additional information about the true identity of the brand that should be legitimately associated with the URL. By using the web site attributes it is often possible to identify the brand in situations where the operations of FIG. 7 have failed. As a result, it is often possible to confirm that a URL is trusted, even though the URL failed the trust criteria applied in FIG. 7.

At step 110, one or more web site attributes are obtained for analysis by the URL verification engine Illustrative web site attributes that can be obtained include attributes from the content of the web page corresponding to the URL and attributes from an SSL certificate associated with the URL. The content of the web page corresponding to the URL and the content of an SSL certificate from the web site associated with the URL contain information that can reveal the correct identity of the brand that should legitimately be associated with the URL. Often the web page content and/or SSL certificate content will reveal an association which is not detectable using the URL verification operations of FIG. 7. For example, the title bar of the web page associated with the URL may reveal that the URL's web page is associated with the "Long Beach Playhouse," even though the second level domain for the URL is "lbph.com.". In this type of situation, attempting to extract the brand "Long Beach Playhouse" directly from the text string "lbph.com" would not be successful. However, because the page title contains the text string "Long Beach Playhouse", consulting the page title reveals the correct brand.

During step 110, web page content and SSL certificates can be captured using browser 28. Web page content is delivered to browser 28 whenever a user browses to a given URL. Web page content may include the content of the web page's title bar (e.g., the page title text string located between the web page's title tags), meta tag content (e.g., text located between web page meta tags such as the text that is commonly displayed as part of a search engine's search results following a search), copyright information (e.g., copyright text such as copyright text in a page footer), etc. The SSL certificates are provided to browser 28 during the dialog involved in setting up a secure sockets layer link between browser 28 and a web site. During the process of establishing a normal SSL link, the SSL certificate that is provided to the browser is authenticated by a trusted certificate authority. SSL links are encrypted, so they are generally used when web sites collect sensitive user information. SSL certificates contain an organization name field and a common name field. The names in these fields represent web site attributes that may be used to help identify the correct brand associated with the URL.

After a suitable web site attribute has been obtained at step 110, the URL verification engine 30 extracts the proposed brand from the web site attribute at step 112. The URL verification engine 30 preferably uses the second level domain (minus its top level domain and suffix, if any) in extracting the proposed brand.

Any suitable techniques may be used to extract the proposed brand using the web site attribute and second level domain as inputs. With one suitable approach, the methods of steps 114, 116, and 118 are used.

At step 114, URL verification engine 30 attempts to extract the proposed brand from the web site attribute by searching for space-expanded versions of the second level domain within the attribute. Consider, as an example, a situation in which the URL is www.bankofamerica.com. In this situation, the second level domain is bankofamerica.com. Using the steps of FIG. 7, the URL verification engine 30 can extract the proposed brand "bankofamerica" from the second level domain. Search engine 20 might not be able to propose an improved spelling for names missing two spaces such as "bankofamerica," so this proposed brand might yield an uncertain result at step 104. However, using a web site attribute such as the web page title associated with the URL www.bankofamerica.com, URL verification engine 30 is able to accurately identify the correct brand associated with the URL.

As an example, consider the situation in which the web page attribute that is being examined is the web page title string. The web page title obtained from the web page located at www.bankofamerica.com is "Bank of America|Home|Personal"), which contains the correct brand name associated with www.bankofamerica.com (i.e., "Bank of America"). During step 114, the URL verification engine removes spaces from the web page title string to produce the collapsed title bar string "BankofAmerica|Home|Personal". The collapsed title bar string includes extra text ("|Home|Personal") that is not part of the brand. The URL verification engine 30 removes this extra text by comparing the second level domain (from which the top level .com domain has been stripped) to the collapsed string. In particular, the URL verification engine 30 attempts to match the string "bankofamerica" from the second level domain with a portion of the collapsed string "BankofAmerica|Home|Personal". In this example, the portion "BankofAmerica" matches. The URL verification engine then reinserts the spaces that were removed from the page title in their original locations, producing the proposed brand "Bank of America". As this example demonstrates, URL verification engine 30 is able to use web site attribute information and information from the second level domain to accurately extract a proposed brand in situations in which the brand name in the URL is missing spaces.

The operations of step 116 are used to address situations in which the URL contains a full or partial acronym for the brand. Consider, as an example, the URL www.lbph.com, which is associated with the organization "Long Beach Playhouse." The web attribute that is captured during step 110 in this example is the page title of the www.lbph.com web page, which is "* Long Beach Playhouse *". During step 116, the URL verification engine 30 identifies the initial characters in each set of characters that are separated by a space (e.g., *, L, B, P, and *"). These initial characters are sometimes referred to as word-start characters or initial letters. After identifying the word-start characters, the URL verification engine 30 compares the second level domain from which the top-level domain has been stripped ("lbph") with the page title ("* Long Beach. Playhouse *"). During this comparison, the URL verification engine identifies that the first three letters of the second level domain ("l", "b", and "p") are associated with respective word-start characters in the page title. The fourth letter in the domain ("h") is not a word-start character, but is contained in the string "Playhouse". Moreover, the fourth letter is contained in the page title in the correct order (i.e., it appears fourth, after the "p"). Based on factors such as the correlation between the initial characters of the page title and the second level domain and the position of non-word-start characters within the page title (such as the "h" in this example), the URL verification engine 30 can identify the string "Long Beach Playhouse" to use as the proposed brand.

Sometimes page titles and other web site attributes use shorthand notations for longer words. For example, a URL might use the term "1st" rather than "first" or might contain the term "2nd" rather than "second". A symbol such as the "+" symbol might be used to represent the word "and". During step 118, the proposed brand is identified by taking into consideration linguistic equivalents such as these.

With one suitable approach, the URL verification engine 30 extracts the string "1stnationalbank" from the second level domain by stripping the top level domain. The URL verification engine then substitutes the string "first" for "1st" in the string to produce the string "firstnationalbank". This revised version of the second level domain string is then compared to the page title (or other web site attribute). In this example, the substitution of a non-symbolic and non-numeric but linguistically equivalent term "first" for the numeric term "1st" results in a string "firstnationalbank" that is closer to the correct brand ("First National Bank") than a string extracted directly from the second level domain (i.e., 1stnationalbank). The web attribute in this example is the page title for the web page associated with www.1stnationalbank.com. The page title is "First National Bank Homepage". By using the operations of step 114, the URL verification engine 30 collapses the page title to produce the space-removed string "FirstNationalBankHomepage". The URL verification engine 30 then compares the revised linguistically-substituted version of the second level domain string ("firstnationalbank") to the collapsed version of the page title ("FirstNationalBankHomepage)". The matching string is "FirstNationalBank," which, after removed spaces have been reinserted, reveals that the correct brand associated with the URL is "First National Bank".

In general, the URL verification engine 30 can use the capabilities of steps 114, 116, and 118 and other suitable string processing functions in any suitable combination. In the First National Bank example, both the linguistic substitution function of step 118 and the space-expanding function of step 114 were used to identify the proposed brand "First National Bank". Other suitable combinations of steps 114, 116, and 118 may be used if desired.

In the examples discussed in connection with step 112, the web attribute used in identifying the proposed brand was a web page title. This is merely illustrative. Any suitable attribute associated with the web site at the second level domain may be used if desired. These attributes include web page content such as page titles, meta tag data, copyright information, etc. and SSL certificate content such as name information from the organization and common name fields.

The brand extraction functions of step 112 may be performed if the status of the URL has previously been determined to be uncertain. Alternatively, these brand extraction functions may be performed when previous verification operations suggest that the URL is untrusted (or is either untrusted or uncertain). If desired, the brand extraction functions of step 112 may be performed for all URL verifications.

After the proposed brand has been extracted at step 112, the URL verification engine 30 uses the second level domain and proposed brand as query terms to query search engine 20. Any suitable search engine queries may be submitted at step 120 (e.g., link count queries, page hit queries, queries to produce ranked lists, improved spelling queries, etc.), as described in connection with step 102 of FIG. 7. With one suitable approach, the search engine 20 is directed to return a link count and a ranked list. The link count indicates how many web links exist to the second level domain. The ranked list is an ordered list of second level domains containing the proposed brand.

At step 122, the URL verification engine uses the link count and the position of the second level domain within the ranked list to determine whether the URL is legitimately associated with the brand and is therefore to be trusted or is not legitimately associated with the brand and is therefore untrusted. In making this determination, the URL verification engine can compute a trust index TI, using equation 3.

$$TI=(LC>1000)\text{AND}(RANK<6) \tag{3}$$

In equation 3, LC is the link count obtained during step 120 of FIG. 8. The variable RANK represents the position of the second level domain in the ranked list of second level domains obtained during step 120. Equation 3 uses Boolean logic. If the link count is greater than the threshold value of 1000 and the second level domain is within the five top positions in the ranked list, the value of TI will be 1 and the URL will be trusted. If the link count is less than 1000 or if the second level domain is not within the five top positions in the ranked list, the trust index TI will be 0 and the URL will not be trusted.

At step 124, the URL verification service notifies the user of the results of the URL verification operations. As with steps 98 and 106 of FIG. 7, if the URL is trusted, the user can be provided with a visual or audio confirmation indicator confirming this result. If the URL is not trusted, the web page associated with the URL can be blocked and/or the user can be warned with a visual and/or audio warning message.

The foregoing is merely illustrative of the principles of this invention and various modifications can be made by those skilled in the art without departing from the scope and spirit of the invention.

What is claimed is:

1. A computer-implemented method for determining whether or not web page universal resource locators (URLs) are associated with trusted or fraudulent web sites, comprising:
   as a user browses the world wide web using computing equipment, obtaining a URL for a web page of unknown authenticity, wherein the URL comprises a second level domain and wherein the second level domain comprises a top level domain;
   obtaining, with computing equipment, a web site attribute that is associated with the URL and separate from the URL;
   identifying, with computing equipment, a proposed brand that is associated with the URL using information from the URL and information from the web site attribute, wherein identifying the proposed brand comprises:
      extracting proposed brand text from the URL by discarding the top level domain from the second level domain; and
      comparing the extracted proposed brand text with the information from the web site attribute to identify the proposed brand;
   querying, with computing equipment, a search engine to determine whether the proposed brand is legitimately associated with the URL, comprising:
      directing the search engine to produce a link count of how many web links exist to the second level domain; and
      directing the search engine to produce a ranked list of which second level domains contain the proposed brand; and
   computing, with computing equipment, a Boolean trust factor using the link count and the ranked list.

2. The method defined in claim 1, wherein the web site attribute comprises a web page title identified by title tags in the web page, the method further comprising:
   using the web page title in identifying the proposed brand.

3. The method defined in claim 1, wherein the web site attribute comprises meta-tag information in the web page, the method further comprising:
   using the meta-tag information in identifying the proposed brand.

4. The method defined in claim 1, wherein the web site attribute comprises copyright information from a footer of the web page, the method further comprising:
   using the copyright information in identifying the proposed brand.

5. The method defined in claim 1, wherein the second level domain corresponds to a web site that has an associated secure sockets layer (SSL) certificate containing organization name and common name fields and wherein the web site attribute comprises the organization name or the common name, the method further comprising:
   using the organization name or common name in identifying the proposed brand.

6. The method defined in claim 1 wherein identifying the proposed brand comprises:
   obtaining a text string from the web attribute;
   removing spaces from the text string to produce a collapsed version of the text string; and
   attempting to match at least a portion of the second level domain to at least a portion of the collapsed version of the text string.

7. The method defined in claim 1 wherein identifying the proposed brand comprises:
   obtaining a text string from the web attribute; and
   attempting to identify whether at least some characters in the second level domain are an acronym by comparing those characters to the text string.

8. The method defined in claim 1 wherein identifying the proposed brand comprises:
   obtaining a text string from the web attribute; and
   determining whether at least some characters in the second level domain form an acronym for words in the text string by comparing the characters in the second level domain to word-start characters in the text string.

9. The method defined in claim 1 wherein identifying the proposed brand comprises:
   obtaining a text string from the web attribute;
   making linguistically-equivalent substitutions for numeric strings in the second level domain; and
   determining whether at least a portion of the second level domain in which the linguistically-equivalent substitutions have been made matches at least a portion of the text string obtained from the web attribute.

10. The method defined in claim 1 wherein the computing equipment with which the user browses the world wide web communicates with a sever over a communications network, the method further comprising:
    examining a cache of previous URL verification results at the computing equipment to determine whether the proposed brand is legitimately associated with the URL; and
    if examination of the cache reveals that it is unknown whether the proposed brand is legitimately associated with the URL, sending a URL verification request containing the URL from the computing equipment to the server, wherein querying the search engine to determine whether the proposed brand is legitimately associated with the URL comprises using the server to query the search engine to determine whether the proposed brand is legitimately associated with the URL in response to the URL verification request from the computing equipment.

11. A computer-implemented method for determining whether or not web page universal resource locators (URLs) are associated with trusted or fraudulent web sites, comprising:
    as a user browses the world wide web using computing equipment, obtaining a URL for a web page of unknown authenticity, wherein the URL contains a second level domain;
    obtaining, with computing equipment, a web page title string from text located between title tags in the web page;
    comparing, with computing equipment, at least a portion of the second level domain to the web page title string to identify a proposed brand;
    querying, with computing equipment, a database using at least the proposed brand;
    using results from querying the database to determine, with computing equipment, whether the proposed brand is legitimately associated with the URL, wherein:
       querying the database comprises providing the database with at least a portion of the second level domain and the proposed brand as query terms; and using the results comprises performing computations on a link count that represents how many web page links exist to the second level domain and determining which position the second level domain holds in a ranked list of second level domains corresponding to web sites containing the proposed brand; and computing, with computing equipment, a Boolean trust factor using the link count and the ranked list.

12. The computer-implemented method defined in claim 11 wherein querying the database comprises transmitting a search engine query to a search engine over the internet.

13. The computer-implemented method defined in claim 11 wherein querying the database comprises providing the database with at least a portion of the second level domain and the proposed brand as query terms.

14. The computer-implemented method defined in claim 11 wherein comparing the portion of the second level domain to the web page title string to identify the proposed brand comprises determining whether the portion of the second level domain matches a collapsed string formed by removing spaces from the web page title string.

15. The computer-implemented method defined in claim 11 wherein comparing the portion of the second level domain to the web page title string to identify the proposed brand comprises determining whether the portion of the second level domain serves as an acronym for words in the web page title string.

16. The computer-implemented method defined in claim 11 wherein comparing the portion of the second level domain to the web page title string to identify the proposed brand comprises comparing a version of the second level domain in which linguistically-equivalent terms have been substituted for numeric terms to the web page title string.

17. The method defined in claim 11 wherein the computing equipment with which the user browses the world wide web is user computing equipment that communicates with a sever over a communications network, the method further comprising:

preprocessing the URL at the user computing equipment to determine its status; and if the status of the URL is uncertain, sending a URL verification request to the server, wherein querying the database comprises using the server to query the database.

* * * * *